United States Patent [19]

Hansen et al.

[11] 3,947,854

[45] Mar. 30, 1976

[54] THERMAL PRINTER SYSTEMS

[75] Inventors: Raymond J. Hansen, Centerville; Gerald A. St. Jacques, Germantown; Robert M. Whitely, Dayton, all of Ohio

[73] Assignee: NCR Corporation, Dayton, Ohio

[22] Filed: Sept. 16, 1974

[21] Appl. No.: 506,067

[52] U.S. Cl..................... 346/76 R; 101/1; 250/316; 346/74 N

[51] Int. Cl.²........................................... G01D 15/10

[58] Field of Search..................... 346/76 R; 178/94; 346/74 J; 250/316; 101/1

[56] References Cited

UNITED STATES PATENTS

| | | | |
|---|---|---|---|
| 1,765,448 | 6/1930 | Ranger | 346/76 R X |
| 2,358,102 | 9/1944 | Robertson | 346/139 C X |
| 3,110,824 | 11/1963 | Flanagan | 350/269 X |
| 3,267,481 | 8/1966 | Bauer et al. | 346/75 X |
| 3,373,438 | 3/1968 | Hochberg | 346/75 X |
| 3,545,374 | 12/1970 | Hendricks | 101/1 |
| 3,765,027 | 10/1973 | Bresnick | 346/74 J |

*Primary Examiner*—Joseph W. Hartary
*Attorney, Agent, or Firm*—J. T. Cavender; Albert L. Sessler, Jr.; Edward Dugas

[57] ABSTRACT

The thermal printer system is comprised of a means for generating heated air and a means for controlling the application of the heated air to a thermally sensitive recording medium. In an embodyment of the invention there is provided a means for ionizing a column of gas and a means for attracting or repelling the ionized column of gas along a desired path in response to a control signal. Interposed along the desired path is a means for heating the gas and a thermally sensitive recording medium positioned to intercept the column of heated gas such that a record is made on the recording medium which record is a function of the control signal.

7 Claims, 6 Drawing Figures

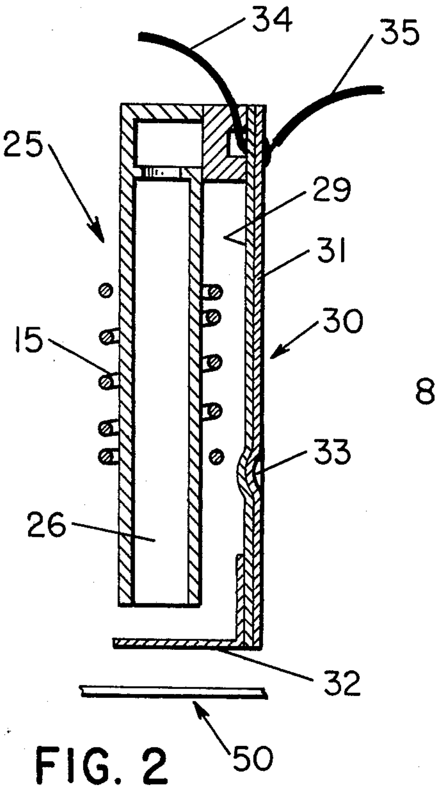
FIG. 2
FIG. 4
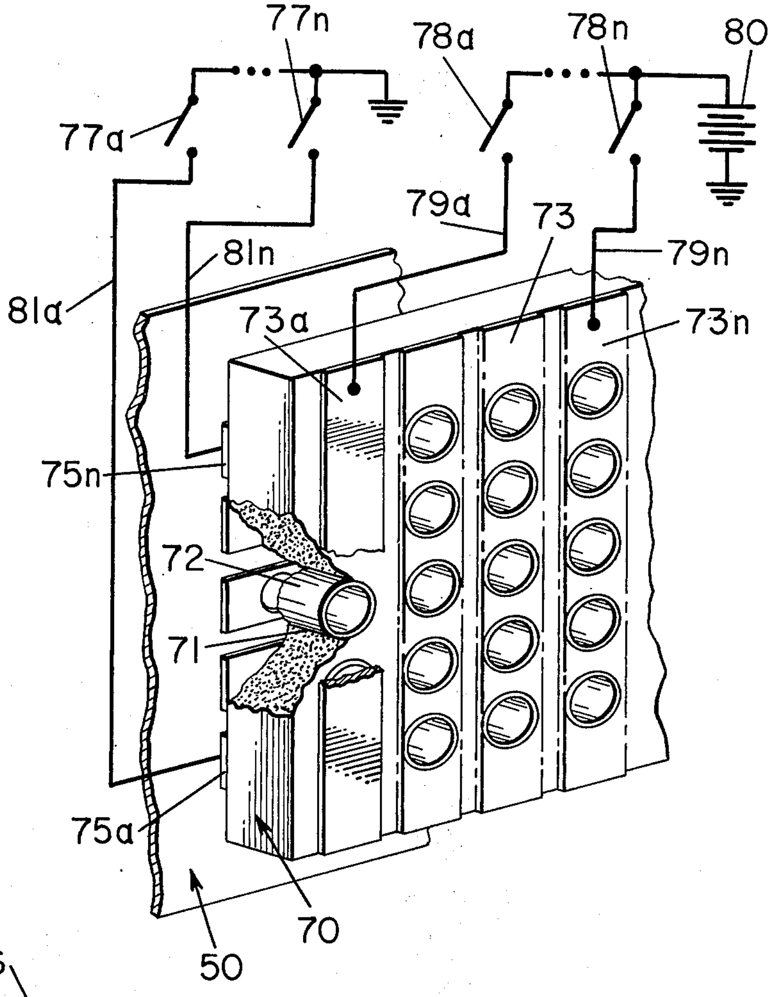
FIG. 3
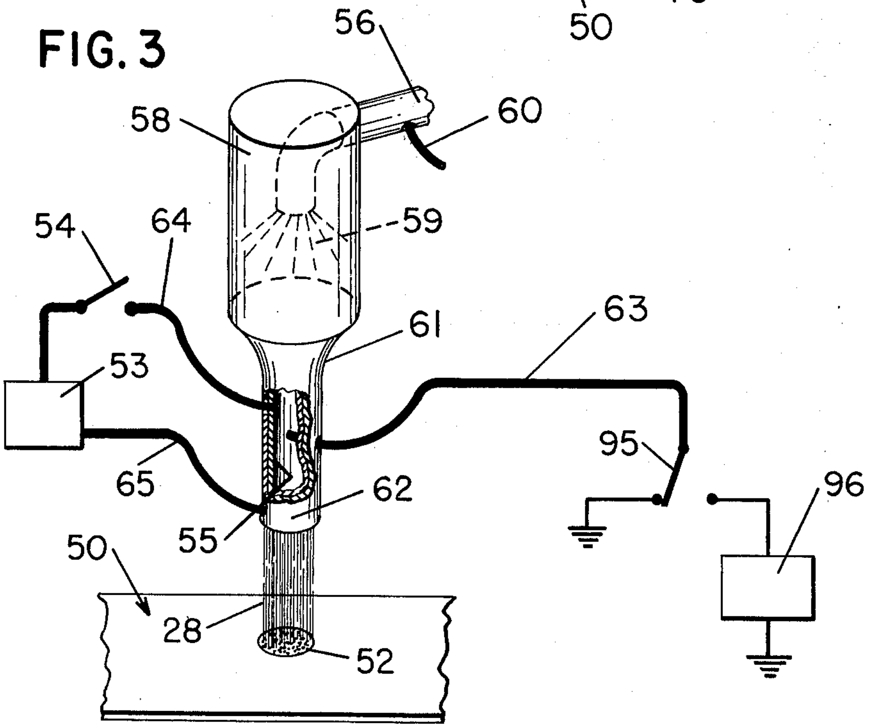

THERMAL PRINTER SYSTEMS

BACKGROUND OF THE INVENTION

The present invention is directed to systems for thermal printing which systems involve the controlled directing of a heated gas against a thermally responsive record medium.

The following list of patents attempts to set forth the state of the prior art:

| | | |
|---|---|---|
| 1,765,448 | 3,177,800 | 3,312,979 |
| 1,770,493 | 3,179,042 | 3,409,904 |
| 2,100,204 | 3,179,946 | 3,495,070 |
| 3,063,050 | 3,187,669 | 3,545,374 |
| | | 3,681,778. |

The device disclosed in U.S. Pat. No. 1,765,448 entitled "Recorder For Facsimile Systems", by R. H. Ranger, utilizes a heating tube to heat a flow of gas and a shutter positioned at the open end of the heating tube to modulate the heated gas flow as a function of the vibrations associated with a telephone receiver. The modulated hot gas is then directed to a thermally sensitive recording medium to provide a visual record.

In U.S. Pat. No. 1,770,493, entitled "Method And Apparatus for Pyro-Recording", by R. H. Ranger, a similar device is shown wherein the heated gas from the heating tube is modulated by a blast of cold air.

The system disclosed in U.S. Pat. No. 2,100,204 entitled "Facsimile System", by H. Shore, utilizes the shutter arrangement, of the general type, shown in the above referenced U.S. Pat. No. 1,765,448. In combination with this shutter arrangement there is employed multiple heaters which are positioned along the flow path of a vaporized ink to reduce condensation. A reduction in the condensation of the ink vapors permits the use of higher pressures on the ink flow and a greater density of ink. Both of which result in a clearer and darker recorded image.

The device of U.S. Pat. No. 3,179,042, entitled "Sudden Steam Printer" by M. Naiman, utilizes a matrix comprised of individual print means each of which consists of a pair of electrodes immersed in an ink. Application of a voltage to the electrodes causes a current to flow through the ink, which current heats the ink and causes part of the ink to vaporize. The vaporized ink creates a pressure on the ink directly above it, forcing the ink droplets onto a recording medium.

In U.S. Pat. No. 3,409,904, entitled "Printer Having Piezoelectric Crystal Printing Means" by K. Maiershofer, an impact hammer is used to make marks on a pressure sensitive record medium. The hammer is formed from a piezoelectric crystal using a bender bimorph configuration. A potential applied to the crystal causes the crystal to bend and impact a hammer head against a pressure sensitive recording medium.

The device of U.S. Pat. No. 3,545,374, entitled "High-Speed Printer Employing A Gas Discharge Matrix" by C. D. Hendricks, Jr., is comprised of an insulating material having a number of perforations within which are positioned inner electrodes. The inner electrodes are used to initiate ionization of the gas within the perforations in response to an electrical signal. One end of each perforation is closed which results in the ionized gas exploding from the perforations at the open end to impinge upon a record medium that is placed in proximity to the open ends.

From the foregoing descriptions of prior art devices it can be seen that there exists a need for a simple inexpensive thermal type printer system that can respond quickly to digital type signals and provide a permanent record of the response. The systems of the present invention attempt to fill that need.

SUMMARY OF THE INVENTION

The present invention relates to improvements in thermal printing systems.

In a first embodiment of the invention means are provided for generating a flow of heated gas. A thermally sensitive recording medium is positioned in the flow path of the heated gas. A piezoelectric deflecting means is positioned in the heated gas flow path to deflect the heated gas from the thermally sensitive recording medium. A means for applying an electrical potential to the piezoelectric deflecting means, when activated, causes the deflection means to deflect from the flow path of the heated gas thereby allowing the heated gas to impinge on the thermally sensitive recording medium.

In a second embodiment of the invention there is provided a means for ionizing a column of gas and a means for attracting or repelling the ionized column of gas along a desired path in response to a control signal. Interposed along the desired path is a means for heating the gas and a thermally sensitive recording medium positioned to intercept the column of heated gas such that a record is made on the recording medium which record in a function of the control signal.

In a third embodiment of the present invention a substrate of insulating material having a plurality of holes therethrough with resistive material deposited on the walls of the holes is used to generate jets of heated gas. Electrodes are positioned on either side of the substrate in electrical contact with the resistive material. Means are provided for applying an electrical potential to selected electrodes. Current flow through the resistive material connected to the selected electrodes causes a heating of the resistive material and the ambient gas within the hole thereby effecting a rapid expansion of the gas. A temperature sensitive recording means positioned adjacent the plurality of holes records the impact of the heated gas on its surface.

In a fourth embodiment of the invention a thermally conductive stencil mask, defining a to be recorded pattern, is positioned in the flow path of the heated gas and in proximity to the thermally recording medium. The stencil mask directs the heated gas to the recording medium in the defined pattern. The edges of the stencil mask, defining the pattern, are tapered to a knife edge so as to facilitate the transfer of heat from the recording medium to the knife edges to the remainder of the stencil mask. The quick transfer of heat from the recording medium to the knife edges minimizes blurring of the recorded pattern.

In a fifth embodiment of the invention a plurality of channels are formed in an electrically insulated substrate. Each channel is coated with a layer of electrically resistive material. Means are provided for applying an electrical potential across selected layers of electrically resistive material so as to cause the resistive material to heat. A flow of air is directed thru each of the channels.

The portion of the flow passing thru a channel wherein the resistive material is heated will in turn be heated. A thermally sensitive recording medium is positioned in the path of the heated air flow to record the patterns of heated air.

Accordingly, it is a primary object of the present invention to provide an improved system for thermal printing.

It is another object of the present invention to provide a thermal printing system which is simple and inexpensive.

The foregoing and other objects of the present invention will become more apparent and better understood when taken in conjunction with the following description and the accompanying drawings, throughout which like characters indicate like parts, and which drawings form a part of this application.

BRIEF DESCRIPTION OF THE DRAWINGS

FIG. 2 is a second view of a portion of the embodiment shown in FIG. 1;

FIG. 3 is a perspective view of a second embodiment of the invention;

FIG. 4 is a perspective view partially sectioned of a third embodiment of the invention;

DESCRIPTION OF THE PREFERRED EMBODIMENTS OF THE INVENTION

Figure 1:
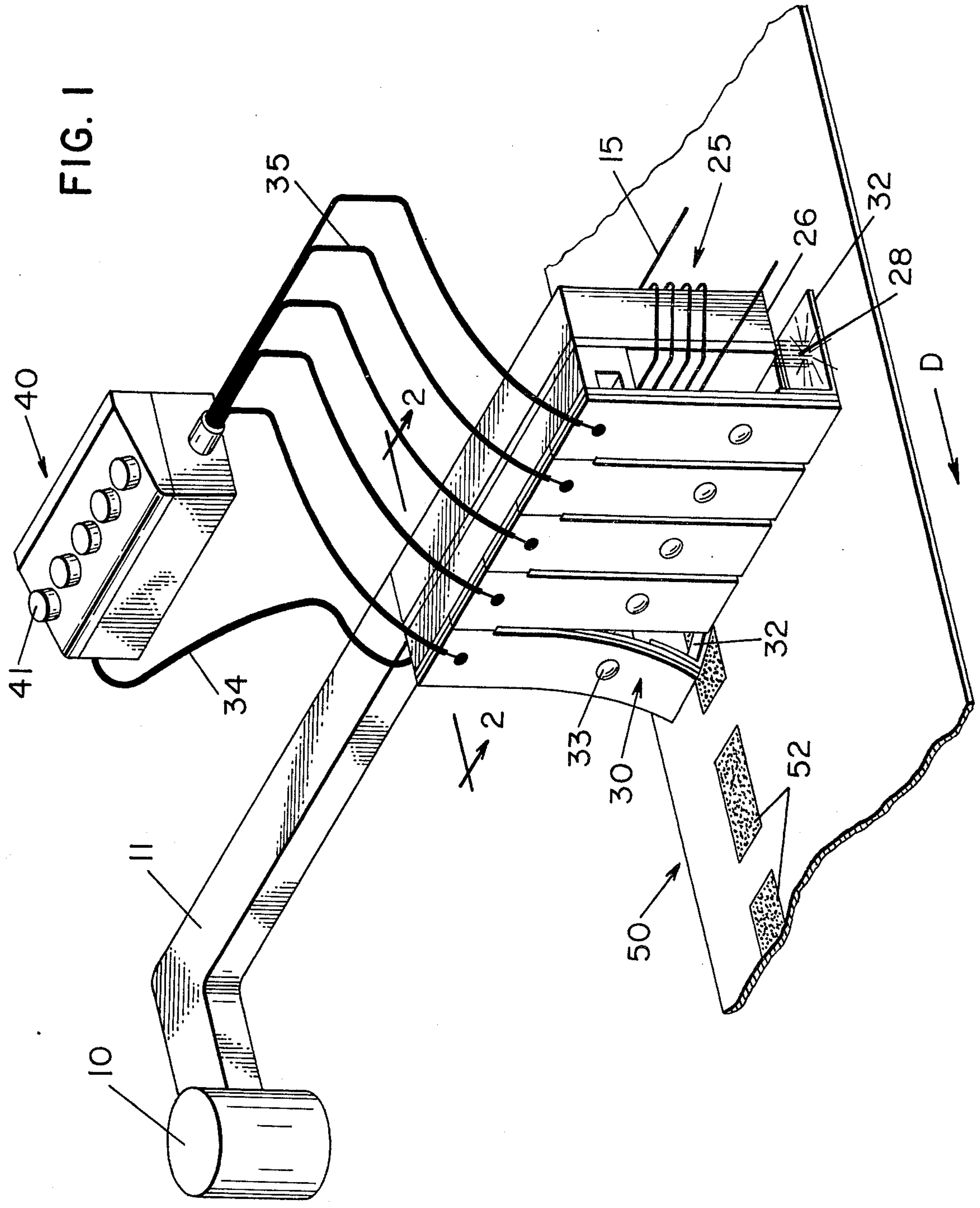
FIG. 1 is a perspective view of one embodiment of the invention.

Referring to FIGS. 1 and 2, a pressurized source of air, or other type gas, 10 provides a stream of air to a conduit 11, which conduit directs the stream of air to a distribution module 25. Heated air exits from the distribution module by means of individual writing channels 26. Each writing channel collimates an individual blast of air 28. A heating element 15 heats the air within each channel to a temperature which is sufficient to activate a thermally sensitive recording medium. The number of writing channels determines the number of channels of information that can be written simultaneously. Each of the heated air blasts 28 are directed towards a thermally sensitive recording medium 50. Interposed in the path of each heated air blast 28 is an L-shaped projection 32, which projection is affixed to one end of a controllably deflectable element 30 such as a bi-metallic element. The plurality of bi-metallic elements 30 are physically connected at one end to the distribution module 25. Each bi-metallic element is formed from two thermally dissimilar metallic segments 29 and 31. A common electrical conductor 34 connects all of the segments 29, of each of the bi-metallic elements 30, in a common circuit to a control box 40. Operator selection keys 41, on the control box 40, apply power to selected electrical conductors 35. Each conductor 35 is electrically connected to an individual metallic segment 31. A potential applied across a bi-metallic element will cause the element to flex, displac the L-shaped projection 32 from the path of the heated air blast 28. The thermally sensitive recording medium 50 intercepts the heated air blast 28, and changes color in the areas that are heated. The thermally sensitive recording medium 50 may be moved past the distribution module in the direction shown by the action arrow D, by any well known means. A visual pattern is thus created which corresponds to the keys that have been depressed. An oil can dimple 33 may be formed in the bi-metallic element 30 to facilitate its flexing.

The bi-metallic element 30 may be replaced with a piezoelectric crystal using a bender bimorph configuration to decrease the response time between the application of the electrical signal to element 30 and its actual deflection.

Referring to FIG. 3, in a second embodiment of the invention unheated air is allowed to enter an ionization chamber 58. The chamber 58 is formed from an electrically non-conductive material. An electrically conductive support section 56 projects into the chamber 58. Electrically attached to the end of section 56 which projects into chamber 58 is a plurality of conductive whiskers 59. A suitable high voltage is applied to the whiskers 59 to cause the air within the chamber 58 to become ionized. A reducing cylinder 61, which may be electrically conductive, connects one end of chamber 58 to a tube 62 so as to collimate the ionized air. The thermally sensitive material 50 is positioned below the open end of tube 62. A conductor 60 is electrically connected to tube section 56. A conductor 63 extends into the open area of the tube section 62, and is electrically insulated from the tube section 62. Conductor 63 is connected to a source of control voltage 96 or to ground by means of a switch 95. The control voltage from source 96 is of such a potential and magnitude that it will repel the ionized air from the tube 62 towards the chamber 58. With the switch 95 in the ground position the charge on the air molecules will be removed and the air will flow through the tube 62. Electrical conductors 64 and 65 are inserted through one wall of tube 66, to extend into the tube defined passageway traversed by a resistive material, or a heating element 55, which is affixed to the inner wall of tube section 62 and is connected in circuit with conductors 64 and 65. A potential applied across conductors 64 and 65, by means of a power source 53 and an off-on switch 54, will cause a current to flow through the resistive material thereby heating the air flowing thru tube 62. The heated air is directed to the thermally sensitive material 50 causing a change in color of the areas which are hit. Air flow is achieved without pressure sources by an "ion wind" phenomenon.

Referring now to FIG. 4, another embodiment of the invention is shown formed from an electrically insulating substrate 70, having a plurality of holes 71 formed therethrough in a matrix pattern, with each of the holes being plated through with a layer of resistive material 72. A plurality of electrically conductive strips, 73*a* to 73*n*, are positioned parallel and separated from each other on one surface of the insulated surface 70, effectively closing one end of the holes 71 while making electrical contact with the resistive material 72. A plurality of electrical conductive strips, 75*a* to 75*n*, having openings therethrough corresponding in number and location to the holes covered by the conductors, 73*a* to 73*n*, are positioned on the opposite surface of the substrate 70, parallel and separate from each other. The conductors 73*a* and 73*n* form column selection electrodes and the conductors 75*a* and 75*n* form row selection electrodes. A potential applied to a selected column and row electrode will cause a current to flow through the resistive material 72 connecting the selected column and row electrode at the crossover point. The current flowing through the resistive material will heat the resistive material which in turn will heat the air within the hole. The heated air will quickly expand causing a blast of heated air to exit from the open end of hole 71. The thermally sensitive material 50 which is positioned adjacent the insulating substrate 70 on the side facing the open ends of the holes 71 will receive the blast of heated air and change color in the area hit by the blast. A means, not shown, can be used to move the thermally sensitive material into recording positions with respect to holes 71. The row electrodes, 75*a* to 75*n*, are individually connected by means of conductors, 81a to 81n, to individual switches, 77*a* to 77*n*, which switches when closed connect the respective row electrodes to ground. The column electrodes, 73*a* to 73*n*, are individually connected by means of conductors, 79*a* to 79*n*, to individual switches, 78*a* to 78*n*, which switches when closed connect the respective column electrodes to the potential source 80.

Figure 5:
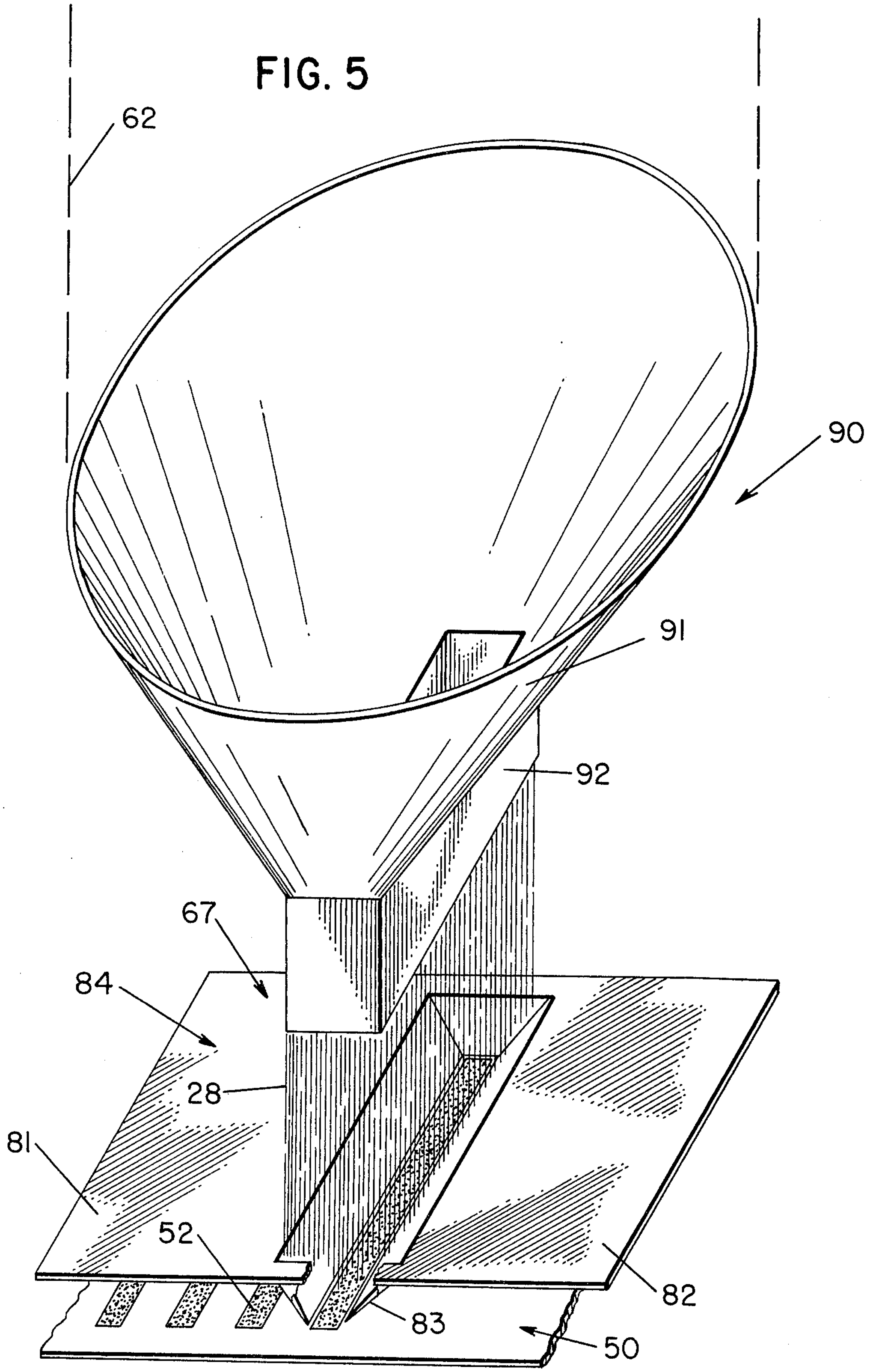
FIG. 5 is a partially cut-a-way perspective view of a fourth embodiment of the invention.

Referring to FIG. 5, another embodiment of the invention is shown which embodiment may be used in conjunction with the embodiment shown in FIG. 3; heated air from, for example, the tube 62 of FIG. 3, is directed to a stencil mask 67 by means of a manifold 90. The manifold 90 is made from two hollow sections, 91 and 92. Section 92 is rectangular in shape. Section 91 is shaped to form a smooth transition between the rectangular shape of section 92 and tube 62. The stencil mask if formed of a flat thermally conductive plate 84 including two portions 81 and 82. One edge of portions 81 and 82 is tapered to a knife edge 83 and bent downward at an angle. The knife edges, of portions 81 and 82, are spaced apart a distance corresponding to the width of a desired bar image. The thermally sensitive material 50 is positioned below and in close proximity to the edges of plates 81 and 82. In operation the heated air from the manifold 90 is directed to the thermally sensitive material, via the space between the edges of the plates 81 and 82. The knife edges 83 are used to facilitate the transfer of heat from the edge area to the non-tapered portion of the plates 81 and 82. The quick transfer of heat from the edge area minimizes the smudging of the bar image on the thermally sensitive material that would normally occur with heating of the plates.

Figure 6:
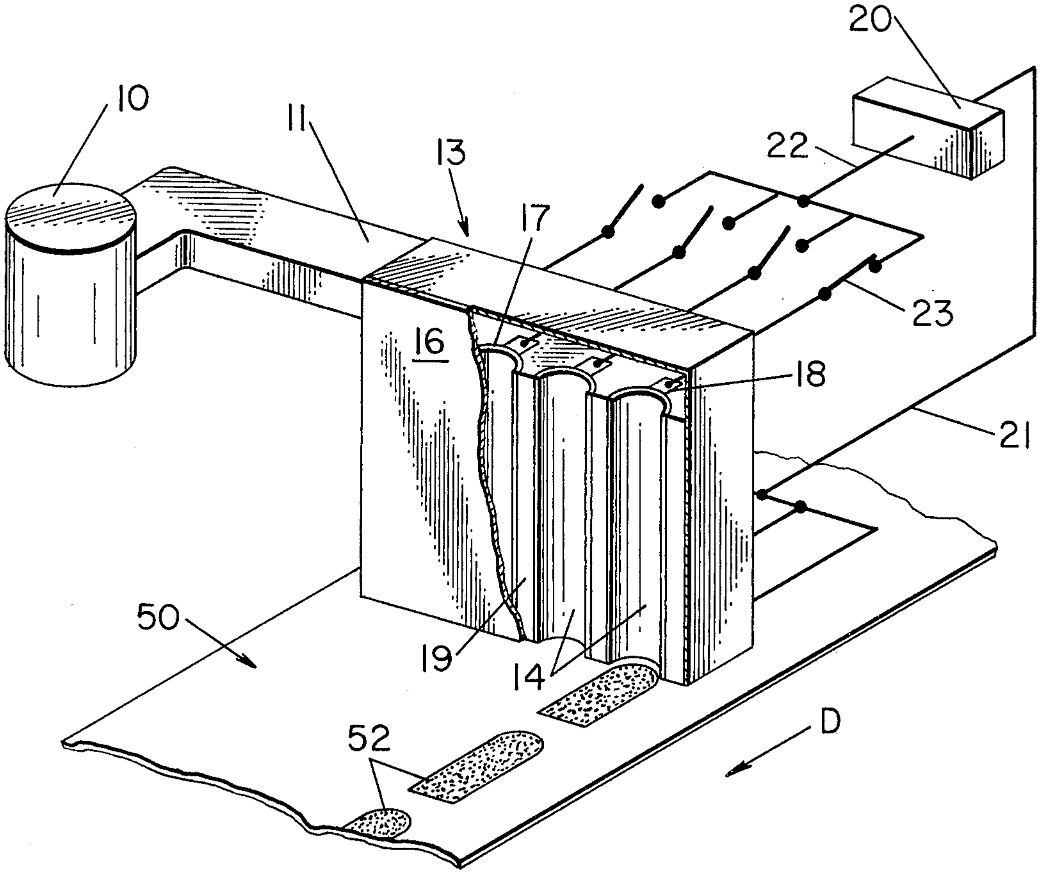
FIG. 6 is a perspective view of a fifth embodiment of the invention.

Referring to FIG. 6, another embodiment of the invention is shown wherein the pressurized source of air 10 provides a stream of air to the conduit 11, which conduit directs the stream of air to a distribution module 13. The distribution module 13 may be comprised of a substrate 19 formed from an electrically insulative material such as a glass or a ceramic. The substrate 19 has a plurality of parallel groves 14 which extend along its length and which communicate with the conduit 11. The grooves 14 are coated with a film of electrically resistive material 17, such as tin oxide, chromium, cermet, or other suitable material so as to form electrical heating elements. Electrically conductive tabs 18 are connected to the resistive material 17 at each end of the grooves 14. A power supply 20 is connected in common by lead 21 to all of the tabs 18 located at one end of the grooves 14. The power supply 20 is connected in circuit with a selected resistive film 17 by means of lead 22 and the closing of a selected switch 23. Heat is produced by the passage of a current through the selected resistive film 17. A flat cover plate 16 covers the grooves 14 to form air channels. Air passing through the formed channels is heated by the resistive film 17. The heated air exiting from a channel forms a pattern 52 on the thermally sensitive recording medium 50. The thermally sensitive recording medium 50 may be moved past the distribution module 13 in the direction shown by the action arrow D.

While there has been shown what are considered to be the preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A thermal printer for printing on thermally sensitive material comprising in combination:
- means for ionizing a gas to cause said gas to flow in a path directed to impinge on said material;
- electrode means positioned in the flow path of said ionized gas for controlling the flow of said ionized gas;
- a first potential source having a polarity and magnitude sufficient to repel said ionized gas;
- a second potential source having a polarity and magnitude sufficient to de-ionize said ionized gas; and
- switch means for selectively connecting said electrode means to either said first or said second potential source; and
- heating means for heating said gas.

2. A thermal printer according to claim 1 wherein said heating means is comprised of;
- a tube for encompassing and directing the flow of said gas to said thermally sensitive material;
- resistive means affixed to the inner wall of said tube; and
- potential means for applying a potential to said resistive means, so as to heat said gas.

3. The printing apparatus according to claim 1 and further comprising:
- a stencil means positioned in proximity to said thermally sensitive material so as to intercept the flow of heated gas to said thermally sensitive material, said stencil having at least one opening therethrough to define a desired character, the edges of said at least one opening being tapered to a knife edge so as to facilitate heat transfer from said knife edge to the remainder of said stencil means.

4. The printing apparatus according to claim 3 wherein said stencil means angles towards said thermally sensitive material in the area forming said taper.

5. A thermal printer for printing on thermally sensitive material comprising in combination:
- an ionization chamber for ionizing a gas, said chamber having at least one opening therein such that ionization of the gas within said chamber causes ionized gas to flow in a path directed to impinge on said thermally sensitive material through said at least one opening;
- electrode means positioned in the flow path of said ionized gas for controlling the flow of said ionized gas;
- a first potential source having a polarity and magnitude sufficient to repel said ionized gas;
- a second potential source having a polarity and magnitude sufficient to de-ionize said ionized gas;
- switch means for selectively connecting said electrode means to either said first or said second potential source; and
- heating means for heating the de-ionized gas.

6. The printing apparatus according to claim 5 and further comprising:

a stencil means positioned in proximity to said thermally sensitive material so as to intercept the flow of heated gas to said thermally sensitive material, said stencil having at least one opening therethrough to define a desired character, the edges of said at least one opening being tapered to a knife edge so as to facilitate heat transfer from said knife edge to the remainder of said stencil means.

7. The printing apparatus according to claim 6 wherein said stencil means angles towards said thermally sensitive material in the area forming said taper.

* * * * *